United States Patent
Smaldone et al.

(10) Patent No.: US 10,540,202 B1
(45) Date of Patent: Jan. 21, 2020

(54) TRANSIENT SHARING OF AVAILABLE SAN COMPUTE CAPABILITY

(71) Applicant: EMC IP Holding Company LLC, Hopkinton, MA (US)

(72) Inventors: Stephen Smaldone, Woodstock, CT (US); Ian Wigmore, Westborough, MA (US); Steven Chalmer, Redwood City, CA (US); Jonathan Krasner, Coventry, RI (US); Chakib Ouarraoui, Watertown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 53 days.

(21) Appl. No.: 15/719,324

(22) Filed: Sep. 28, 2017

(51) Int. Cl.
*G06F 9/48* (2006.01)
*G06F 9/50* (2006.01)

(52) U.S. Cl.
CPC .......... *G06F 9/4881* (2013.01); *G06F 9/485* (2013.01); *G06F 9/4856* (2013.01); *G06F 9/5027* (2013.01); *G06F 2209/5019* (2013.01)

(58) Field of Classification Search
CPC ................................ G06F 9/4881; G06F 9/52
USPC ........................................ 718/102, 103, 104
See application file for complete search history.

(56) References Cited

U.S. PATENT DOCUMENTS

| | | | | |
|---|---|---|---|---|
| 2002/0049841 | A1* | 4/2002 | Johnson | H04L 67/10 709/225 |
| 2005/0240924 | A1* | 10/2005 | Jones | G06F 9/4881 718/100 |
| 2008/0016508 | A1* | 1/2008 | Goto | G06F 9/5088 718/102 |
| 2009/0254917 | A1* | 10/2009 | Ohtani | G06F 9/5027 718/104 |
| 2010/0115049 | A1* | 5/2010 | Matsunaga | G06F 3/0626 709/216 |
| 2013/0268933 | A1* | 10/2013 | Bhandari | G06F 9/5044 718/1 |
| 2015/0143382 | A1* | 5/2015 | Chen | G06F 9/5005 718/104 |
| 2015/0301858 | A1* | 10/2015 | Chung | G06F 9/4893 718/103 |

* cited by examiner

*Primary Examiner* — Phillip H Nguyen
(74) *Attorney, Agent, or Firm* — Womble Bond Dickinson (US) LLP (57) ABSTRACT

Embodiments are described for a executing a processing job using one or more nodes of a storage area network using computing resources on the SAN that are predicted to be idle. A predictive model is generated by monitoring idle states of resources of nodes of the SAN and using machine learning to build the predictive model. A scheduler executes jobs on one or more nodes of the SAN with sufficient predicted idle resources to process the job, in accordance with resource requirements and job attributes in a manifest of the job. If a job cannot be completed during a window of time that the necessary resources are predicted to be idle, or if one or more resources become unavailable, the job can be paused and resumed, migrated to another node, or restarted at a later time when the required resources to complete the job are predicted to be idle.

21 Claims, 7 Drawing Sheets

TRANSIENT SHARING OF AVAILABLE SAN COMPUTE CAPABILITY

TECHNICAL FIELD

This disclosure relates to the field of distributed computing in a storage area network (SAN).

BACKGROUND

A storage area network (SAN) generally forms a network of storage arrays that provide block-level access to storage, and attached hosts. Such hosts typically include unused or underutilized hardware such as graphics processing units (GPUs), due to lack of need for graphical display, and central processing units (CPUs) due to idle periods of computation. It is also common for there to be underutilized computing hardware within a storage array. It is typical for storage arrays to be deployed with a certain amount of additional resources provisioned for future growth and to handle periods of peak workloads. Further, since the hosts and storage arrays form a tightly coupled network to cooperatively serve application workloads, idle periods for hosts tend to be correlated to idle periods for storage arrays. The total amount of underutilized or idle hardware across an entire SAN, including both arrays and attached hosts, is often a non-trivial amount of available computing resources that are unused in the SAN.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for scheduling and executing workloads using resources of nodes of a storage area network (SAN) that are predicted to be idle during the execution of the workload. In a first embodiment, a computer-implemented method of scheduling and executing a workload (processing job) on a plurality of nodes of a multi-node network can include determining, by a scheduler on a first node in the multi-node network, at least one second node in a multi-node network on which to execute the processing job using a plurality of computing resources predicted to be idle to execute the processing job on the at least one second node. In response to determining that the actual state of the computing resources predicted to be idle on the at least one second node meets or exceeds the predicted state of the computing resources predicted to be idle on the at least one second node, the job can be executed on the at least one second node. In an embodiment, the multi-node network can be a storage area network (SAN) and the nodes of the multi-node network comprise a plurality of host computers and at least one storage appliance. In an embodiment, the determining by the scheduler can be based at least in part upon a predictive model of idle times of computing resources on a plurality of nodes of the multi-node network. The method can also include, in response to determining that an actual state of computing resources predicted to be idle on the at least one second node does not meet the computing resources predicted to be idle for executing the processing job on the at least one second node: determining at least one third node on which to execute the processing job and executing the job on the at the least one third node. In an embodiment, the method can include, in response to determining, during the execution of the processing job on the at least one second node, that at least some of the computing resources predicted to be idle on the at least one second node are no longer idle or are no longer available to the processing job: determining that the processing job is pausible; pausing the processing job until the computing resources required to complete the processing job on the at least one second node are predicted to be idle for a predicted remaining execution time of the processing job; and resuming execution of the processing job on the at least one second node. In a further embodiment, the method can include, in response to determining, during the execution of the processing job on the at least one second node, that at least some of the computing resources predicted to be idle on the at least one second node are no longer idle or are no longer available to the processing job: determining that the processing job is restartable; determining a second predicted time at which the resources for executing the processing job are predicted to be idle on the at least one second node; and restarting execution of the processing job on the at least one second node. In yet a further embodiment, the method can include, in response to determining that at least some of the computing resources predicted to be idle on the at least one second node are not idle or are no longer available to the processing job: migrating the processing job to a fourth node in the multi-node network that has the plurality of resources for executing the processing job predicted to be idle; and executing the processing job on the at least one fourth node. Exemplary embodiments above have been described with reference to specified node numbers. The inventive concepts described herein can be implemented on any number of nodes.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. A representative application programming interface is described below with reference to FIG. 6. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Applications of the Disclosed Systems and Methods

1. Distributed Deduplication

In the present disclosure, a host wishing to issue writes to a storage array can perform an offload to a host with idle resources which perform a deduplication analysis. Offloading deduplication analysis to a host with idle resources increases the overall level of parallelism in the deduplication workload, while also potentially increasing the efficiency of the data chunk reference caching.

2. Cross-Array Workload Analysis

Cross-array analysis is the process of analyzing performance of a storage array by analyzing distribution of workloads across storage arrays. In the prior art, this analysis was done by an administrator. The systems and methods described herein enable the coordination necessary for cross-array/SAN analysis to be performed, while engaging unused, idle resources to do the analysis.

3. Cross-Host Path Coordination

The systems and methods described herein enable the formation of ad-hoc, on-demand paths between hosts and storage arrays via coordination between peer hosts and their associated storage arrays. A SAN-aware layer can be built on top of the system described herein which collects a set of potential secondary paths that exist in the SAN. It also collects associated workloads for each path. In the event that a host wishes to include secondary paths so that it can potentially offload inputs/outputs (I/Os) to some other available <host, path>pair. Using the systems and methods described herein, a host and storage assay can now include secondary paths via offload to other hosts having idle computing resources.

Figure 1:
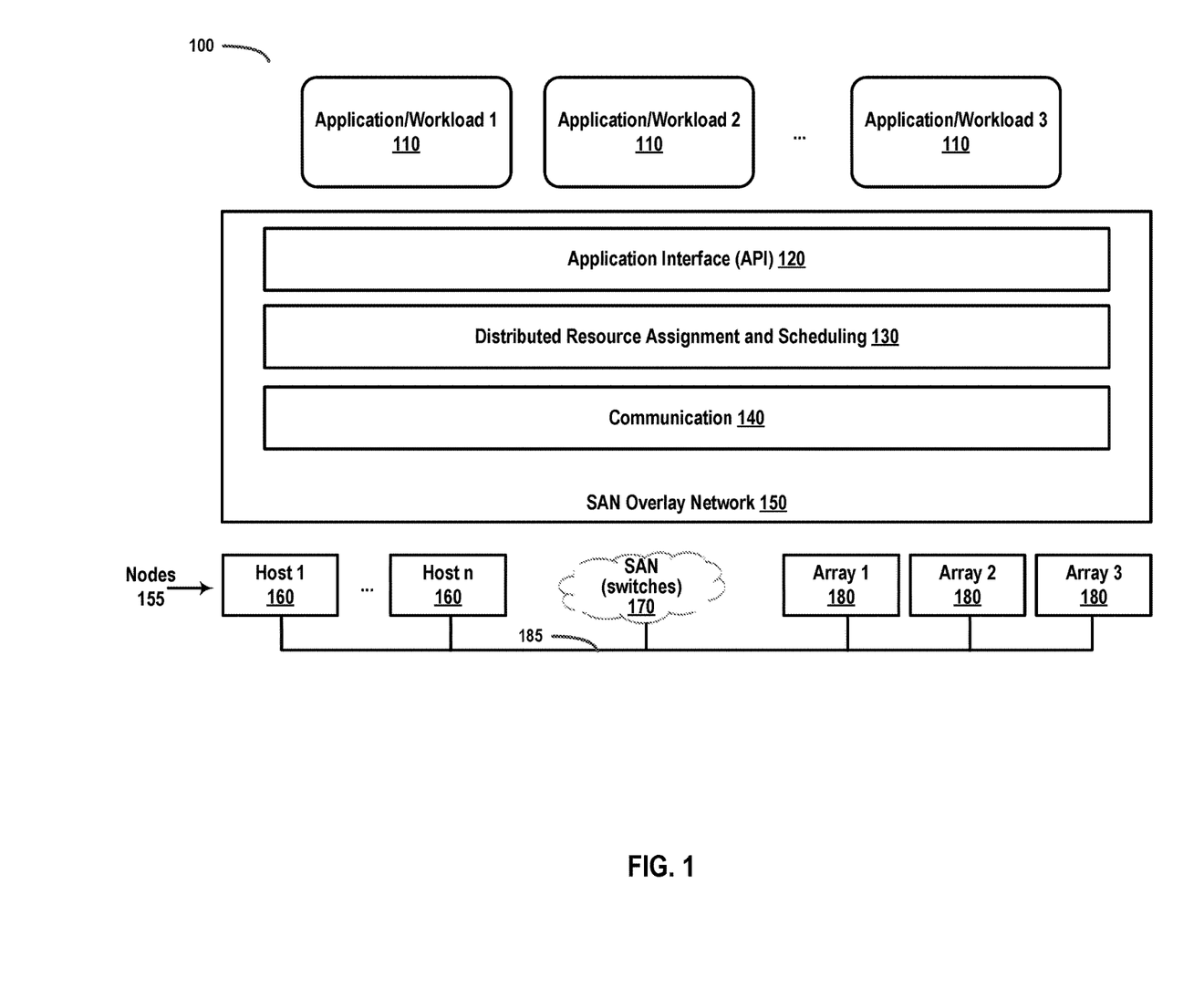
FIG. 1 illustrates, in block diagram form, an overview of a storage area network (SAN) that can perform distributed computing using transient sharing of available SAN computing resources, in accordance with some embodiments.

FIG. 1 illustrates, in block diagram form, an overview 100 of a storage area network (SAN) that can perform distributed computing using transient sharing of available SAN computing resources, in accordance with some embodiments.

A storage area network 100 that can perform distributed computing using transient sharing of available SAN computing resources can include three core layers that make-up a SAN overlay network 150: (i) one or more application programming interfaces (APIs) 120, (ii) a distributed resource assignment and scheduling layer 130, and (iii) a communication layer 140. Application/workloads 110 (or just, "workloads") can utilize a SAN overlay network 150 to execute on nodes of a SAN that are predicted to have idle resources. Nodes 155 can include one or more host computing devices 160, one or more SAN switches 170, and one or more storage arrays 180 communicatively coupled via network 185. The system 100 can function by executing in a fully distributed model, directly on the available idle resources of the SAN nodes 155, or can be deployed in a centralized model using a separate, dedicated, SAN-attached node 155 whose sole purpose is to execute the system.

One or more applications, or "workloads" 110 can be generated by a programmer, using one or more APIs 120. Workloads can, individually or as a group, be associated with a manifest containing detailed information about the function(s), resources needed to execute the function(s), degree and manner to which the function(s) can be executed in parallel, and predicted execution time based on an estimated or predetermined amount of expected parallelism in execution of the function(s).

A distributed resource assignment and scheduling system (DRAS system) 130 can receive function(s) and one or more manifests, collectively a "processing job," and schedule the processing job for execution on one or more nodes of the SAN 100 using otherwise idle processing resources of the one or more nodes 155. DRAS system 130 can include a predictive model that is used to determine the one or more nodes having sufficient predicted idle resources to execute the processing job within a predicted period of time that the resources are expected to be idle. DRAS system 130 can also include a resource monitor that monitors resources of a node to determine resources that are idle, when the resources are idle, and for how long the resources are idle. One or more nodes 155 in the SAN 10 can each have a resource monitor. Information collected by the resource monitor can be used to update the predictive model using machine learning techniques.

Communication layer 140 can implement peer-to-peer inter-process communication (IPC) for workloads 110. Communication layer 140 provides a low-overhead, low-latency, high-bandwidth mechanism for distributed, transient workloads 110 to rely upon for IPC between nodes 155 across the SAN 10. Communication 140 can include data security.

A host computing device 160 is a type of node 155 that can be a single-user computing device, multi-processing server device, or a host for a plurality of virtual machines, each having access to the SAN 100. Host 160 can be a desktop computing device, server computing device, tablet computer, laptop computer, mobile device, or other computing device. A representative computing device is described below with reference to FIG. 7.

A SAN switch 170 is a type of node 155 comprising a switch that connects hosts and storage devices, such as storage arrays 180, to move storage-related data. A SAN switch 170 can be a Fibre Channel switch or an Ethernet switch. Switches, and protocols, can be combined to make, e.g., a SAN switch using FC protocol over an Internet Protocol (IP) network. SAN Switch 170 can include one or more hardware processors, memory, network interfaces, and local storage that may be considered in determining idle computing resources for updating the predictive model. A plurality of SAN switches can be arranged into a SAN switch fabric.

Storage arrays 180 are a type of node 155 that can include one or more hardware processors, memory, network interfaces, storage controllers, and a large plurality of storage devices, often interconnected by a high-speed backplane or high speed bus. Storage devices can include hard disk drives, flash drives, and other types of storage devices. Examples of storage arrays include Dell® EMC® VMAX storage arrays, Dell® EMC® XtremIO storage arrays, and other storage arrays. Storage arrays can be implemented using a computing system as described below with reference to FIG. 7. In embodiment, underutilized computing hardware from the storage array can be provided by an embedded virtual machine container.

Figure 2:
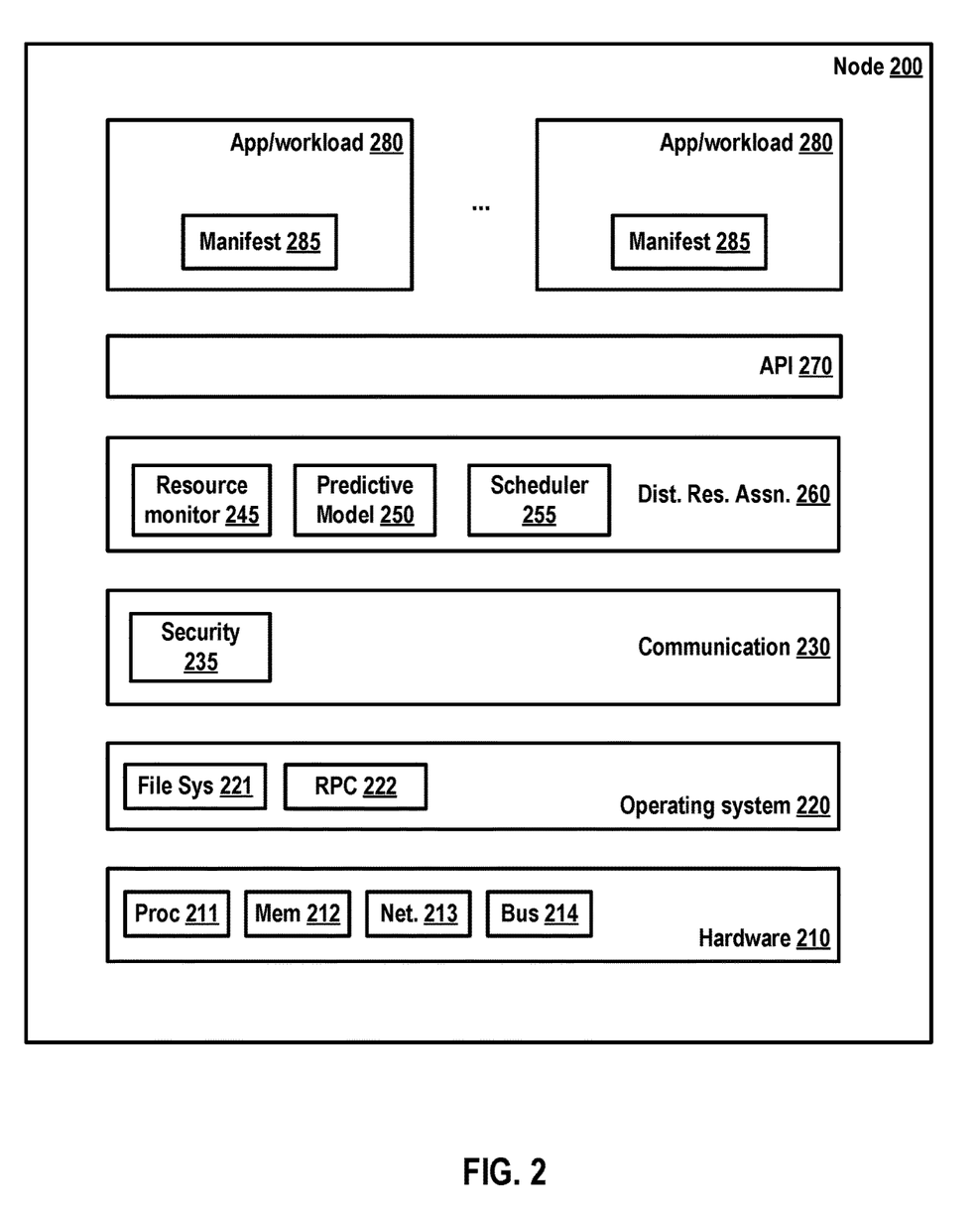
FIG. 2 illustrates, in block diagram form, a node of a storage area network (SAN) that can perform distributed computing using transient sharing of available SAN computing resources, in accordance with some embodiments.

FIG. 2 illustrates, in block diagram form, a node 200 of a storage area network (SAN) that can perform distributed computing using transient sharing of available SAN computing resources, in accordance with some embodiments. Node 200 can represent any of nodes 155 of FIG. 1.

Node 200, like node 155 of FIG. 1, can include workloads 280, an API 270 for programming and deploying one or more functions of the workload 280 and a manifest 285, a distribution resources assignment and scheduling (DRAS) 260, a communication module 230, an operating system 220, and hardware 210 to implement the foregoing modules. As described with reference to FIG. 1, above, workloads 280 can be a collection of one more functions and a manifest 285 that describes attributes of the work 280. Attributes can include a list of one or more functions to execute, parameter lists for functions, parallel execution criteria, memory requirements, estimated processor execution time for one or more processor types, intermediate storage requirements, estimated execution time, specialized processor(s) needed to execute the functions of the manifest, earliest, and/or latest time that the workload 280 must complete, and the like.

DRAS 260 can include a resource monitor 245, predictive model 250, and scheduler 255. Computing resource monitoring information on nodes 200 can include processor utilization time and patterns, instructions executed, memory usage time and amounts, disk I/Os, communication traffic, in terms of bytes transmitted/received, packets, network traffic switching activations, and idle time for these. A resource monitor 245 can monitor one or more computing resources on node 200 and one or more periods of time. Monitoring may continuous, or sampled, over a period of time.

DRAS 260 can include a machine learning module (not shown) to learn utilization patterns of the monitored computing resources to build a predictive model 250. Machine learning can be supervised or unsupervised, using techniques such as Bayes, Naïve Bayes, Linear Regression, and other machine learning techniques. Machine learning techniques can assign a weight to a node in the predictive model 250 based on one or more criteria, such as most likely to be idle, fewest failures, most redundancy, fastest communication, fastest computing resources, and other weighting methods. Predictive model 250 can be used to predict when, and for how long, computing resources on the node 200 will be idle. Node 200 can receive similar information from other nodes 200 to extend the predictive model 250 to include predictions of idle computing resources on other nodes 200. As each node 200 monitors its own computing resource utilization, and idle windows, the node 200 can update its own predictive model 250. Node 200 can also transmit updates to its own predictive model 250 to other nodes 200 that maintain a predictive model 250.

Resource monitor 245 can also monitor hardware, software, and/or network failures and assign a weight to a node 200 in the predictive model 250 based on reliability. For example, if a network node fails (a cut-set) occur, nodes 200 on each side of the cut will continue to operate. However the workload models in the predictive model 250 will automatically change weights as the nodes 200 that are not communicating will be aged out as resource monitoring 245 detects and reports the cut, and updates the predictive model 250 accordingly. As soon as the cut-sets are repaired, the predictive models 250 will incorporate the new resource monitoring 245 information and the predictive models 250 recover. After some period, the predictive models 250 on all nodes 200 will tend to have the same weights again.

When such cut-sets occur, the predictive models 250 are able to infer which target nodes 200 are no longer available. Targets nodes 200 include both hosts and storage arrays. That means that optimized routing information is also available via node weights. For example, should a particular host node 200 be cut off from its closest storage array, it is possible that another host node 200, with which the originating host node 200 can still communicate, still has a connection to that storage array. In this example, model weights afford a 'least-cost-route' to the storage target node 200.

DRAS 260 can also include a scheduler 255. Scheduler 255 can receive workloads 280, analyze the manifest 285 associated with the workload 280 to determine computing resource requirements and estimated computation time in view of any parallelism set forth in the manifest 285. Scheduler 255 can then access predictive model 250 to determine node(s) 200 with idle computing resources having a magnitude that meets or exceeds the requirements of workload 280, taking into account any parallelism that may be obtained. If predictive model 250 indicates multiple nodes 200, combinations of nodes 200, and/or idle times when a workload 280 could be processed, then scheduler 255 can select node(s) 200 and/or a time for processing workload 280. For example, in an embodiment, scheduler 255 may select node(s) 200 for processing workload 280 ("processing job") at a next nearest point in time. In an embodiment, scheduler 255 may select node(s) 200 for processing workload 280 that have the most redundancy as between the node(s) 200, to ensure workload 280 completion even in the event of a possible network failure.

Communication layer 230 can implement reliable, secure, inter-node peer-to-peer style inter-process communication (IPC) for workloads 280. For example, communication 230 may use security module 235 to open a secure socket between node(s) 200 to implement IPC between node(s) 200. Communication 230 can also make remote procedure calls using RPC module 222 of operating system 220. Communication layer 230 can implement one or more inter-node communication protocols such as Internet Protocol, Fibre Channel Protocol, SCSI protocol, iSCSI protocol, or other communication protocol.

Node 200 can also include operating system 220. Operating system 220 can expose a file system 221 to a host 200 or workload 285. In an embodiment, file system 221 exposes a file system 221 namespace to workload 285, or other node 200, and maps blocks of a file to storage array logic unit numbers (LUNs). File system 221 can be exposed to a workload, or other node 200, as a physical device such as a SCSI disk drive.

Node 200 can include hardware 210, including one or more processors 211, memory 212, network interface 213, and high-speed bus or backplane 214. Processors 211 can include at least one hardware processor, one or more special purpose processors, such as a network switching processor, digital signal processor, or other processor type. Memory can include random access memory (RAM), read-only memory (ROM), flash memory, disk storage, and other storage types. A exemplary computing system containing hardware 210 is described below with reference to FIG. 7.

Nodes 200 need not implement all elements of a node 200. For example, some nodes 200 may generate workloads 280, but may not implement a resource monitor 245 or predictive model 250. Other nodes 200 may implement a resource monitor 245 and predictive model 250 but not generate any workloads 280.

Figure 3:
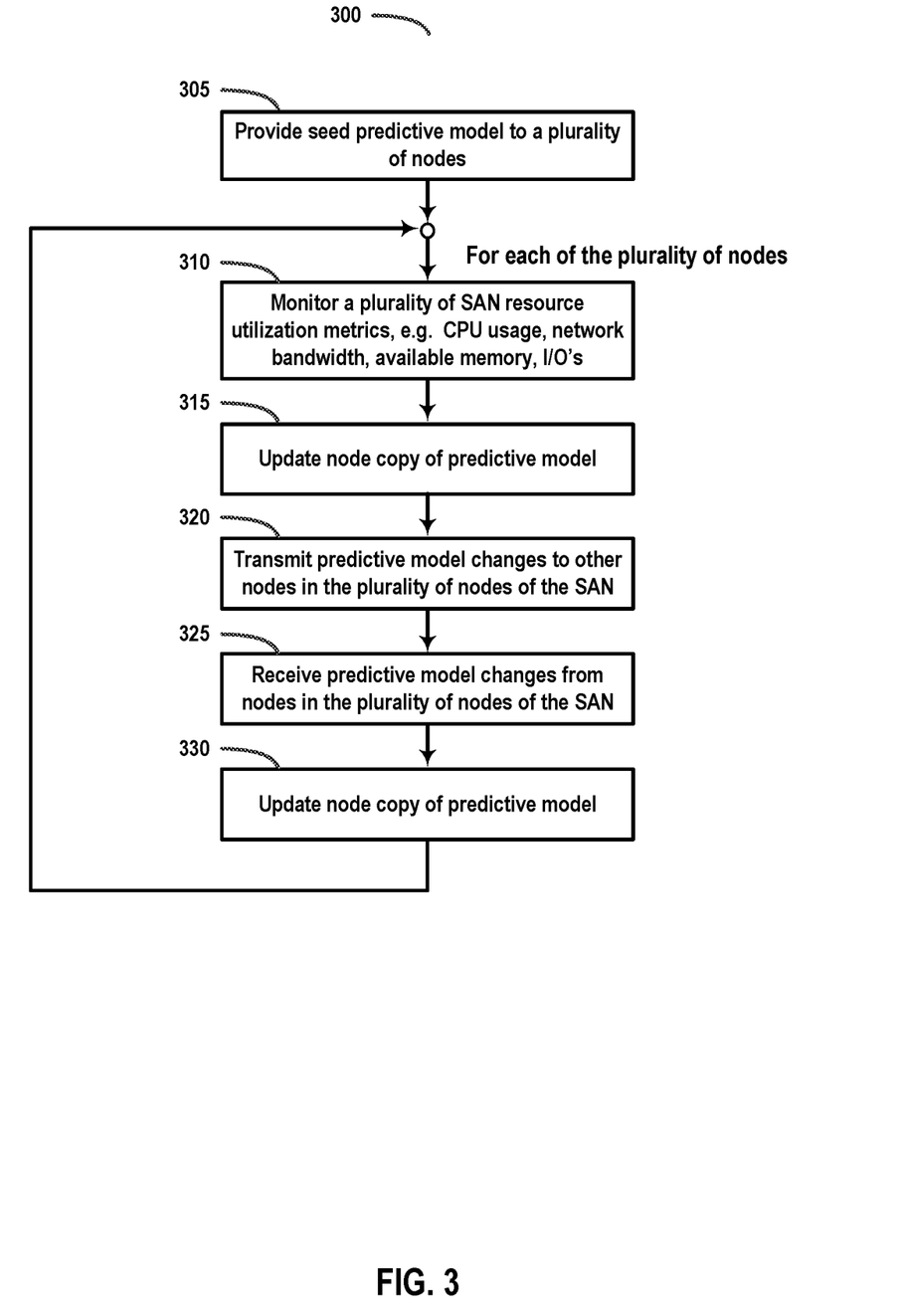
FIG. 3 illustrates in block diagram form, a method of building a predictive model of idle SAN resources for distributed computing using transient sharing of available SAN computing resources, in accordance with some embodiments.

FIG. 3 illustrates in block diagram form, a method 300 of building a predictive model of idle SAN resources for distributed computing using transient sharing of available SAN computing resources, in accordance with some embodiments.

In operation 305, distributed resource assignment scheduler (DRAS) system 260 can be provided with a small, default predictive model 250 with which to facilitate machine learning of the predictive model 250 using information from resource monitor 245.

In operation 310, for each of a plurality of nodes 200 having a predictive model 250, resource monitor 245 can monitor a plurality of resources on node 200. Monitored resources can include processor usage, such as a CPU, DSP, or other processor type, network traffic, network bandwidth, active vs. failed network nodes (cut-sets), available memory and input/outputs (I/Os). Resource monitor 245 can detect periods of time when any/all of these computing resource are idle. In an embodiment, resources can be monitored over predetermined increments of time. In an embodiment, resource usage can be sampled one or more times over the predetermined period of time.

In operation 315, predictive model 250 can be updated using machine learning over the resource monitoring data for the node 200.

In operation 320, node 200 can transmit updates to the predictive model 250 for the node 200 to other nodes 200 in the SAN 100 that maintain a copy of a predictive model 250. In an embodiment, transmitted updates can be in the form of changes to the predictive model 250, rather than the entire predictive model 250.

In operation 325, node 200 can receive updates to predictive models 250 from other nodes 200 in the SAN. In an embodiment, node 200 receives just the changes to a predictive model 200 from other nodes 200. In an embodiment, node 200 receives updates to predictive models 250 from other nodes 200 asynchronously from each other.

In operation 330, node 200 can update its own predictive model 250 using changes to predictive models 250 on other nodes 200, received from other nodes 200. In an embodiment, node 200 can store, e.g. as a batch, one or more updates to predictive models 250 received from other nodes 200 and can update the predictive model on node 200 asynchronously from receiving the updates from other nodes.

Figure 4:
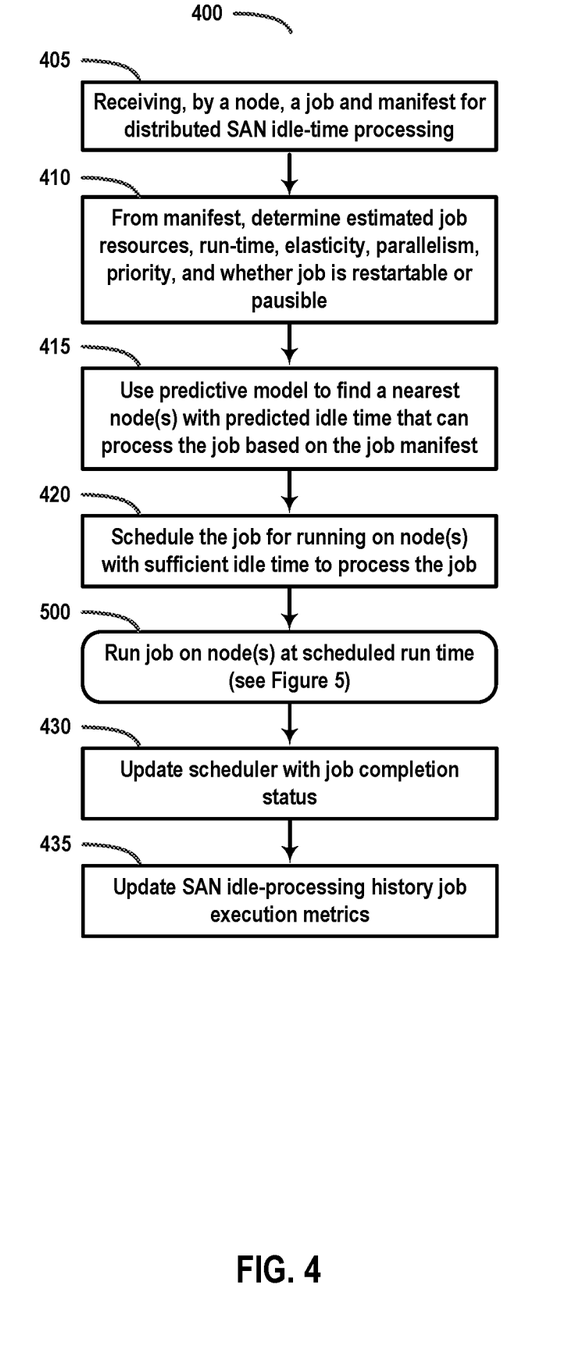
FIG. 4 illustrates, in block diagram form, a method of scheduling a job for executing on a SAN that can perform distributed computing using transient sharing of available SAN computing resources, in accordance with some embodiments.

FIG. 4 illustrates, in block diagram form, a method 400 of a node scheduling a job for execution on a SAN 100 that can perform distributed computing using transient sharing of available SAN computing resources, in accordance with some embodiments.

In operation 405, node 200 can receive a workload 280 and a manifest 285 for a processing job to be executed using transient sharing of available SAN computing resources.

In operation 410, scheduler 255 can analyze the manifest 285 associated with the workload 280 to determine computing resource requirements and estimated computation time in view of any parallelism set forth in the manifest 285.

In operation 415, predictive model 250 can be used to find one or more nodes 200 upon which to execute workload 280 using transient sharing of computing resources. Predictive model 250 can return node(s) 200 to execute workload 280. Scheduler 255 may select one of these node(s) 200 that best matches the resource requirements for the workload 280 as determined from the manifest 285 by the scheduler 255.

In operation 420, scheduler 255 can schedule the processing job of workload 280 on a scheduler queue of scheduler 255. In an embodiment, each node 200 can have its own scheduler and scheduler queue 255. In an embodiment, the scheduler 255 of a node can maintain a scheduling queue of workloads 280 within the nodes of SAN 100.

In operation 500, scheduler 255 runs processing job of workload 280 on one or more nodes 200 of SAN 100 as selected in operation 415. In an embodiment, SAN 100 can have a synchronized clock across all nodes 200 of the SAN 100 and scheduler queue of scheduler 255 can be ordered by a time when the necessary resources to execute the processing job are predicted to be idle. Operation 500 is described in detail below with reference to FIG. 5, below.

In operation 430, when processing job of workload 280 has a scheduling status other than "running," scheduler 255 can be updated with the latest status. For example, when the processing job completes, scheduler can be updated with execution statistics, including processor time used, execution time, memory used, I/O's used, and whether or not the processing job completed successfully, unsuccessfully, is currently paused (and why it is currently paused), or whether processing job was restarted, and when it was restarted.

In operation 435, post-processing statistics about the execution of processing job of workload 280 can be used to update the predictive model 255 with actual execution resource usage values, rather than estimated execution resource usage values. In an embodiment, wherein the workload 280 is a recurring task, post-execution statistics can be used to update the manifest 285 for workload 280 with actual resource usage values. In an embodiment, post-execution execution history can be written to a SAN 100 system log, indicating how much processing was accomplished using actual values of otherwise-idle computing resources.

Figure 5:
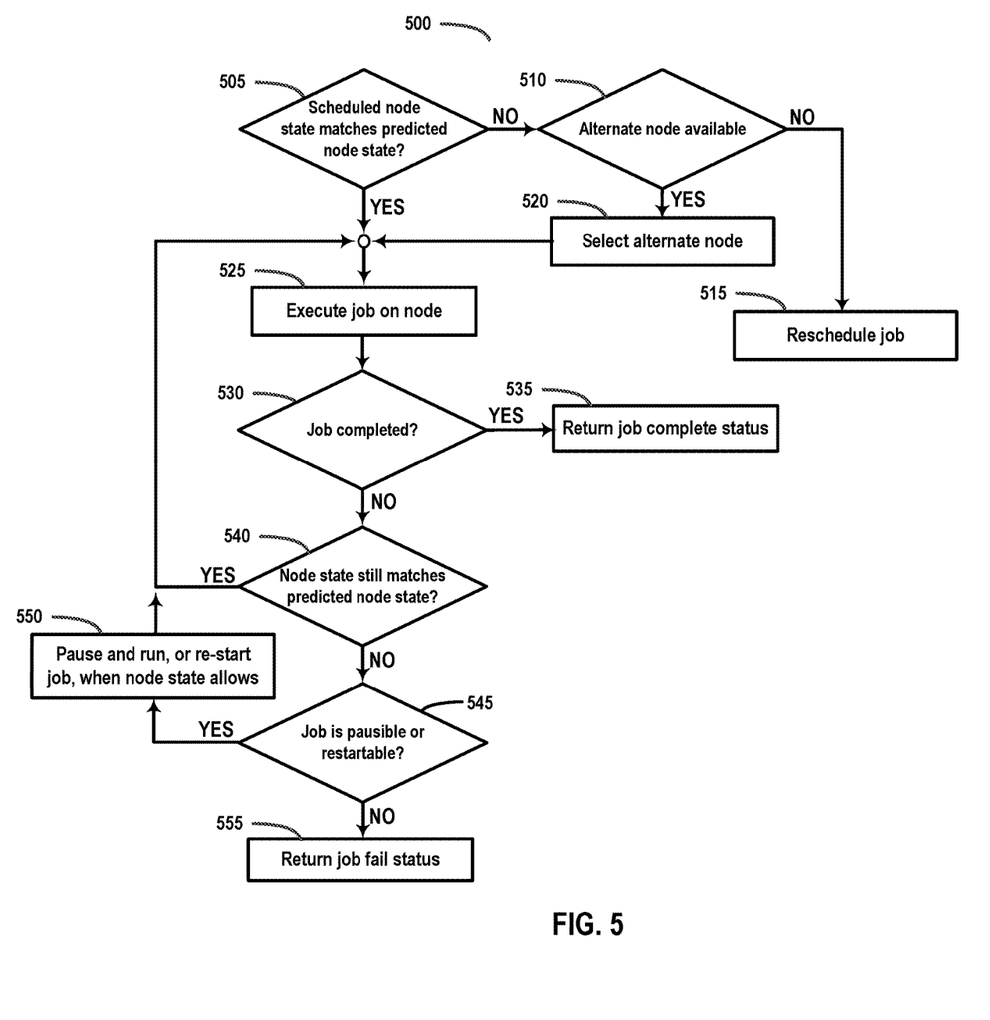
FIG. 5 illustrates, in block diagram form, a method of executing a job on a SAN that can perform distributed computing using transient sharing of available SAN computing resources, in accordance with some embodiments.

FIG. 5 illustrates, in block diagram form, a method 500 of executing a job on a SAN 100 that can perform distributed computing using transient sharing of available SAN computing resources, in accordance with some embodiments.

In operation 505, it can be determined whether scheduler 255 was able to use predictive model 250 to find node(s) 200 having sufficient idle computing resources to process a workload 280. If not, then method 500 continues at operation 510, otherwise method 500 continues at operation 525. For example, it is possible that predictive model 250 found node(s) 200 having predicted sufficient resources to execute workload 280, but predictive model 250 may not yet be updated to reflect the fact that the selected node(s) 200 failed (network cut-set) prior to executing workload 280.

In operation 510, it can be determined whether alternate node(s) 200 were found by predictive model 250 to execute workload 280. If not, then method 500 continues at operation 515, otherwise method 500 continues at operation 520.

In operation 515, workload 280 can be rescheduled to a later time when resources may be available, and method 500 ends.

In operation 520, scheduler 255 can use predictive model 250 to select alternate node(s) 200 for executing workload 280.

In operation 525, scheduler 525 can cause the selected node(s) 200 to execute functions of workload 280 in accordance with manifest 285 for workload 280.

In operation 530, it can be determined with workload 280 has completed. If so, then method 500 continues at operation 535, otherwise method 500 continues at 540.

In operation 535, scheduler 255 can determine, via interprocess communication with the selected nodes 200 that workload 280 has completed successfully. Scheduler can record the successful completion and perform post-processing operations described in FIG. 4, operations 430 and 440, above.

In operation 540, it can be determined whether the predicted idle states for computing resources needed for workload 280 are actually still idle on selected node(s) 200. If so, then method 500 continues at operation 525. Otherwise method 500 continues at operation 545.

In operation 545, it can be determined whether workload 280 is pausible or restartable. If so, then method 500 continues at operation 550. Otherwise method 500 continues at operation 555.

In operation 550, scheduler 255 can either pause or restart workload 280. Scheduler 255 can again access predictive model 250 to determine that sufficient resources to complete workload 280 will become available (be idle) soon. The necessary idle resources may, or may not, be idle on the same node(s) 200 as previously selected to execute the workload 280. Scheduler 255 can migrate the workload 280 to alternate selected node(s) 200 as needed. Scheduler 255 can then pause the workload 280, and restart the workload on the selected node(s) 200. Method 500 continues at operation 525.

In operation 555, scheduler 255 can log a workload 280 failed status. Scheduler 255 can execute any post-processing operations, such as FIG. 4, operations 430 and 440 above. Alternatively, scheduler 255 can re-access the predictive model 250 and attempt to find node(s) 200 that are predicted to have idle resources sufficient to process workload 280 at a later time.

Figure 6:
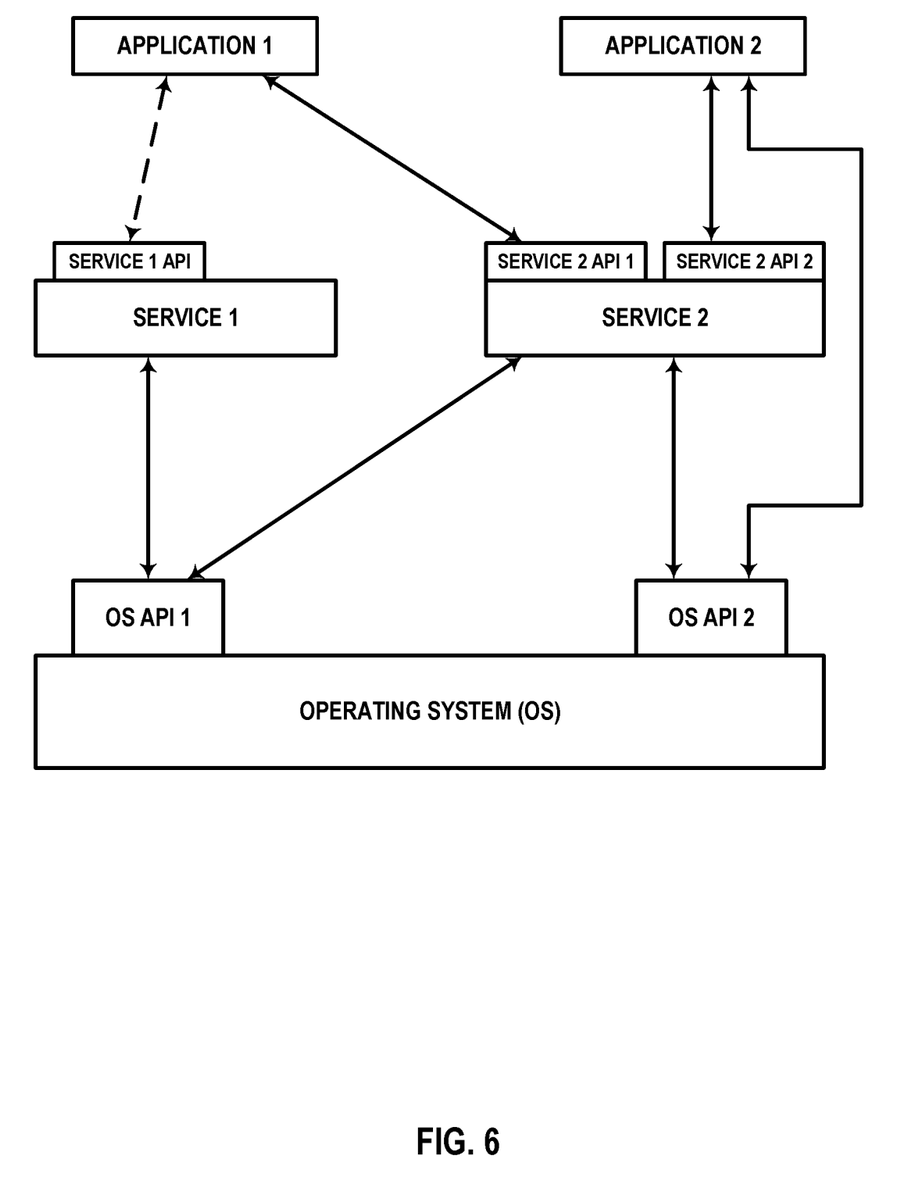
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
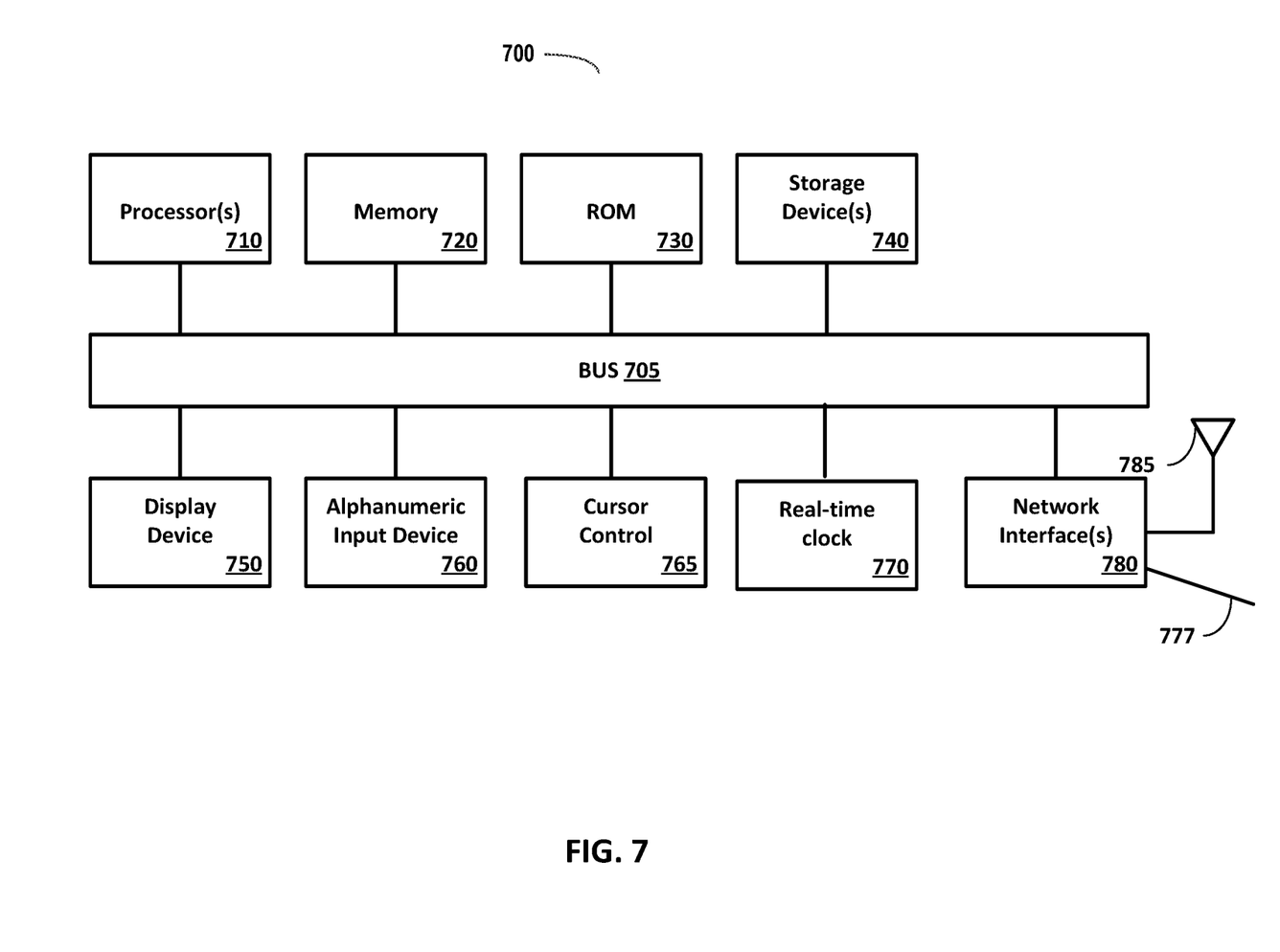
FIG. 7 illustrates, in block diagram form, an exemplary computing system for implementing concepts described herein.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), touch screen display, or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. Certain embodiments above have been described with reference to specified node numbers. The inventive concepts described herein can be implemented on any number of nodes. It will be evident that various modifications and changes can be made thereto without departing from the broader spirit and scope of the invention. The specification and drawings are, accordingly, to be regarded in an illustrative rather than a restrictive sense.

What is claimed is:

1. A computer-implemented comprising:
  receiving, by a scheduler, a processing job and a manifest for the processing job, the manifest including an estimate of one or more resources required to perform the processing job;
  determining, by a scheduler on a first node in a multi-node network, at least one second node in the multi-node network, on which to execute the processing job using a plurality of computing resources predicted to be idle to execute the processing job on the at least one second node, wherein the determining is based at least in part upon whether a predictive model of idle times of computing resources in the multi-node network predicts that there are idle computing resources on the at least one second node having a magnitude that meets or exceeds an estimated requirements to perform the processing job; and
  in response to determining that an actual state of the computing resources predicted to be idle on the at least one second node meets or exceeds a predicted state of the computing resources on the at least one second node, executing the processing job on the at least one second node.

2. The method of claim 1, wherein the multi-node network comprises a storage area network (SAN) and nodes of the multi-node network comprise a plurality of host computers and at least one storage appliance, and the predictive model includes predictions for resources of the at least one storage appliance.

3. The method of claim 1, further comprising updating the predictive model of idle times of computing resources on a plurality of nodes of the multi-node network by updating an estimate of one or more resources required to perform the processing job with actual execution resources used to perform the processing job.

4. The method of claim 1, further comprising:
  in response to determining that the actual state of computing resources predicted to be idle on the at least one second node does not meet the computing resources predicted to be idle for executing the processing job on the at least one second node:
  determining at least one third node on which to execute the processing job;
  executing the processing job on the at the least one third node.

5. The method of claim 1, further comprising:
  in response to determining, during the execution of the processing job on the at least one second node, that at least some of the computing resources predicted to be idle on the at least one second node are no longer idle or are no longer available to the processing job:
  determining that the processing job is pausible;
  pausing the processing job until the computing resources required to complete the processing job on the at least one second node are predicted to be idle for a predicted remaining execution time of the processing job;
  resuming execution of the processing job on the at least one second node.

6. The method of claim 1, further comprising:
  in response to determining, during the execution of the processing job on the at least one second node, that at least some of the computing resources predicted to be idle on the at least one second node are no longer idle or are no longer available to the processing job:
  determining that the processing job is restartable;
  determining a second predicted time at which the resources for executing the processing job are predicted to be idle on the at least one second node;
  restarting execution of the processing job on the at least one second node.

7. The method of claim 1, further comprising:
  in response to determining that at least some of the computing resources predicted to be idle on the at least one second node are not idle or are no longer available to the processing job:
  migrating the processing job to a fourth node in the multi-node network that has the plurality of resources for executing the processing job predicted to be idle;
  executing the processing job on the at least one fourth node.

8. A non-transitory computer-readable medium programmed with executable instructions that, when executed by a processing system having at least one hardware processor, perform operations comprising:
  receiving a processing job and a manifest for the processing job, the manifest including an estimate of one or more resources required to perform the processing job;
  determining, by a scheduler on a first node in a multi-node network, at least one second node the a multi-node network, on which to execute the processing job using a plurality of computing resources predicted to be idle to execute the processing job on the at least one second node, wherein the determining is based at least in part upon whether a predictive model of idle times of computing resources in the multi-node network predicts that there are idle computing resources on the at least one second node having a magnitude that meets or exceeds estimated requirements to perform the processing job; and
  in response to determining that an actual state of the computing resources predicted to be idle on the at least one second node meets or exceeds a predicted state of the computing resources on the at least one second node, executing the processing job on the at least one second node.

9. The medium of claim 8, wherein the multi-node network comprises a storage area network (SAN) and nodes of the multi-node network comprise a plurality of host computers and at least one storage appliance, and the predictive model includes predictions for resources of the at least one storage appliance.

10. The medium of claim 8, wherein the operations further comprise updating the predictive model of idle times of computing resources on a plurality of nodes of the multi-node network by updating an estimate of one or more resources required to perform the processing job with actual execution resources used to perform the processing job.

11. The medium of claim 8, wherein operations further comprise:
  in response to determining that an actual state of computing resources predicted to be idle on the at least one second node does not meet the computing resources predicted to be idle for executing the processing job on the at least one second node:
  determining at least one third node on which to execute the processing job;
  executing the processing job on the at the least one third node.

12. The medium of claim 8, the operations further comprising:
  in response to determining, during the execution of the processing job on the at least one second node, that at least some of the computing resources predicted to be idle on the at least one second node are no longer idle or are no longer available to the processing job:
  determining that the processing job is pausible;
  pausing the processing job until the computing resources required to complete the processing job on the at least one second node are predicted to be idle for a predicted remaining execution time of the processing job;
  resuming execution of the processing job on the at least one second node.

13. The medium of claim 8, the operations further comprising:
  in response to determining, during the execution of the processing job on the at least one second node, that at least some of the computing resources predicted to be idle on the at least one second node are no longer idle or are no longer available to the processing job:
  determining that the processing job is restartable;
  determining a second predicted time at which the resources for executing the processing job are predicted to be idle on the at least one second node;
  restarting execution of the processing job on the at least one second node.

14. The medium of claim 8, the operations further comprising:
  in response to determining that at least some of the computing resources predicted to be idle on the at least one second node are not idle or are no longer available to the processing job:
    migrating the processing job to a fourth node in the multi-node network that has the plurality of resources for executing the processing job predicted to be idle;
    executing the processing job on the at least one fourth node.

15. A system comprising:
  a processing system having at least one hardware processor, the processing system coupled to a memory programmed with executable instructions that, when executed by the processing system, perform operations comprising:
  receiving a processing job and a manifest for the processing job, the manifest including an estimate of one or more resources required to perform the processing job;
  determining, by a scheduler on a first node in a multi-node network, at least one second node in the multi-node network, on which to execute the processing job using a plurality of computing resources predicted to be idle to execute the processing job on the at least one second node, wherein the determining is based at least in part upon whether a predictive model of idle times of computing resources in the multi-node network predicts that there are idle computing resources on at least one second node having a magnitude that meets or exceeds estimated requirements to perform the processing job; and
  in response to determining that an actual state of the computing resources predicted to be idle on the at least one second node meets or exceeds a predicted state of the computing resources on the at least one second node, executing the processing job on the at least one second node.

16. The system of claim 15, wherein the multi-node network comprises a storage area network (SAN) and nodes of the multi-node network comprise a plurality of host computers and at least one storage appliance, and the predictive model includes predictions for resources of the at least one storage appliance.

17. The system of claim 15, wherein the operations further comprise updating the predictive model of idle times of computing resources on a plurality of nodes of the multi-node network by updating an estimate of one or more resources required to perform the processing job with actual execution resources used to perform the processing job.

18. The system of claim 15, wherein the operations further comprise:
  in response to determining that an actual state of computing resources predicted to be idle on the at least one second node does not meet the computing resources predicted to be idle for executing the processing job on the at least one second node:
  determining at least one third node on which to execute the processing job;
  executing the processing job on the at the least one third node.

19. The system of claim 15, the operations further comprising:
  in response to determining, during the execution of the processing job on the at least one second node, that at least some of the computing resources predicted to be idle on the at least one second node are no longer idle or are no longer available to the processing job:
  determining that the processing job is pausible;
  pausing the processing job until the computing resources required to complete the processing job on the at least one second node are predicted to be idle for a predicted remaining execution time of the processing job;
  resuming execution of the processing job on the at least one second node.

20. The system of claim 15, the operations further comprising:
- in response to determining, during the execution of the processing job on the at least one second node, that at least some of the computing resources predicted to be idle on the at least one second node are no longer idle or are no longer available to the processing job:
- determining that the processing job is restartable;
- determining a second predicted time at which the resources for executing the processing job are predicted to be idle on the at least one second node;
- restarting execution of the processing job on the at least one second node.

21. The system of claim 15, the operations further comprising:
- in response to determining that at least some of the computing resources predicted to be idle on the at least one second node are not idle or are no longer available to the processing job:
  - migrating the processing job to a fourth node in the multi-node network that has the plurality of resources for executing the processing job predicted to be idle;
  - executing the processing job on the at least one fourth node.

* * * * *